(12) United States Patent
Rong

(10) Patent No.: US 10,739,968 B2
(45) Date of Patent: Aug. 11, 2020

(54) APPARATUS AND METHOD FOR ROTATING 3D OBJECTS ON A MOBILE DEVICE SCREEN

(71) Applicant: Samsung Electronics Co., Ltd., Gyeonggi-do (KR)

(72) Inventor: Guodong Rong, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 14/948,885

(22) Filed: Nov. 23, 2015

(65) Prior Publication Data

US 2017/0147188 A1 May 25, 2017

(51) Int. Cl.
*G06F 3/048* (2013.01)
*G06F 3/0484* (2013.01)
*G06F 3/0488* (2013.01)
*G06F 3/0481* (2013.01)
*G06F 3/01* (2006.01)

(52) U.S. Cl.
CPC ........ *G06F 3/04845* (2013.01); *G06F 3/0488* (2013.01); *G06F 3/04815* (2013.01); *G06F 3/04883* (2013.01); *G06F 3/017* (2013.01); *G06F 2203/04808* (2013.01)

(58) Field of Classification Search
CPC ........ G06F 3/048; G06F 3/0488; G06F 3/017; G06F 3/04815
See application file for complete search history.

(56) References Cited

U.S. PATENT DOCUMENTS

| | | | | |
|---|---|---|---|---|
| 8,004,498 B1* | 8/2011 | Meridian | ............ | G06F 3/04845 345/156 |
| 8,462,148 B1* | 6/2013 | Reisman | ............... | G06F 3/0425 345/419 |
| 8,581,901 B2* | 11/2013 | Joshi | ....................... | G06T 19/20 345/419 |
| 8,799,821 B1* | 8/2014 | De Rose | ............ | G06F 3/04842 715/848 |
| 9,244,562 B1* | 1/2016 | Rosenberg | .......... | G06F 3/04847 |
| 9,244,590 B1* | 1/2016 | Browder | ............. | G06F 3/04815 |

(Continued)

FOREIGN PATENT DOCUMENTS

| EP | 2211530 A1 | 7/2010 |
|---|---|---|
| EP | 2597585 A1 | 5/2013 |

OTHER PUBLICATIONS

European Search Report dated May 2, 2017 in connection with European Patent Application No. 16 20 0282.

(Continued)

*Primary Examiner* — Mahelet Shiberou

(57) ABSTRACT

An apparatus and method are provided for rotating 3D objects on a mobile device screen. A first finger touch is detected on a touch screen of a mobile electronic device and the presence of a second finger is detected on a second sensor of the device. The second sensor is a different sensor than the touch screen. A motion of the first finger is detected while the second finger is present on the second sensor. In response, a 3D object displayed on a screen of the mobile electronic device is rotated by an amount related to the motion of the first finger. Simultaneous motion of the first and second fingers may be detected, and the 3D object rotated by an amount related to both finger motions.

12 Claims, 4 Drawing Sheets

(56) References Cited

U.S. PATENT DOCUMENTS

| | | | | |
|---|---|---|---|---|
| 9,733,667 B2* | 8/2017 | Kamijima | ............... | G06F 1/162 |
| 2009/0019401 A1* | 1/2009 | Park | ................... | G06F 3/04883 |
| | | | | 715/841 |
| 2009/0051660 A1* | 2/2009 | Feland, III | .......... | G06F 3/04883 |
| | | | | 345/173 |
| 2009/0256809 A1* | 10/2009 | Minor | ................ | G06F 3/03547 |
| | | | | 345/173 |
| 2009/0278812 A1* | 11/2009 | Yasutake | ............ | G06F 3/04815 |
| | | | | 345/173 |
| 2009/0315834 A1* | 12/2009 | Nurmi | .................... | G06F 3/041 |
| | | | | 345/173 |
| 2010/0060588 A1* | 3/2010 | Fong | ................... | G06F 3/04883 |
| | | | | 345/173 |
| 2010/0188353 A1* | 7/2010 | Yoon | ................... | G06F 3/04883 |
| | | | | 345/173 |
| 2010/0214232 A1* | 8/2010 | Chan | ....................... | G06F 3/044 |
| | | | | 345/173 |
| 2012/0026196 A1* | 2/2012 | Deng | .................... | G06F 3/033 |
| | | | | 345/649 |
| 2012/0032891 A1* | 2/2012 | Parivar | ............... | G06F 3/04883 |
| | | | | 345/173 |
| 2012/0110447 A1 | 5/2012 | Chen | | |
| 2013/0005420 A1* | 1/2013 | Ueno | .................... | A63F 9/0826 |
| | | | | 463/9 |
| 2013/0104086 A1* | 4/2013 | Mlyniec | ................ | G06T 19/20 |
| | | | | 715/849 |
| 2013/0127825 A1* | 5/2013 | Joshi | ....................... | G06T 19/20 |
| | | | | 345/419 |
| 2014/0009415 A1* | 1/2014 | Nishida | ............... | G06F 3/04886 |
| | | | | 345/173 |
| 2014/0375596 A1* | 12/2014 | Kim | ..................... | G06F 3/0416 |
| | | | | 345/174 |
| 2015/0029553 A1* | 1/2015 | Fujimoto | .............. | G06F 3/0412 |
| | | | | 358/1.15 |
| 2015/0100910 A1* | 4/2015 | Luo | ..................... | G06F 3/04883 |
| | | | | 715/771 |
| 2016/0291731 A1* | 10/2016 | Liu | ....................... | G06F 1/1656 |

OTHER PUBLICATIONS

Communication pursuant to Article 94(3) EPC dated Dec. 18, 2019 in connection with European Patent Application No. 16 200 282.8, 5 pages.

* cited by examiner

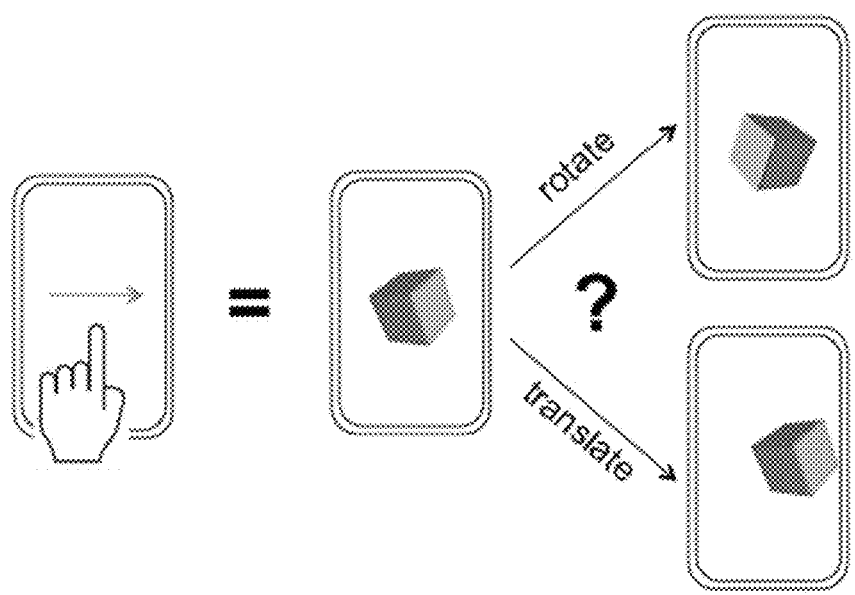
FIG. 4
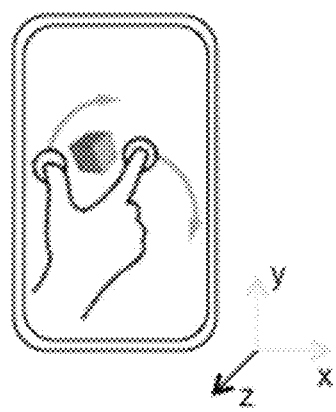 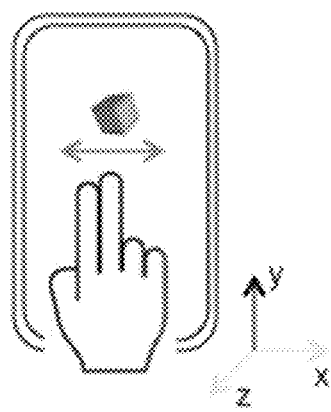 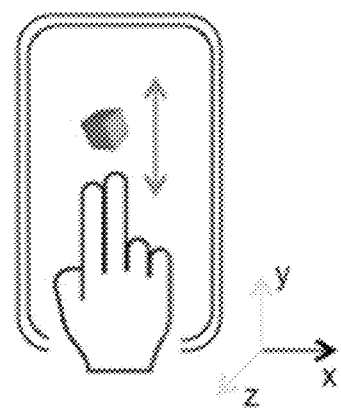
FIG. 5A        FIG. 5B        FIG. 5C

APPARATUS AND METHOD FOR ROTATING 3D OBJECTS ON A MOBILE DEVICE SCREEN

TECHNICAL FIELD

The present application relates generally to a mobile device user interface and, more specifically, to an apparatus and method for rotating 3D objects on a mobile device screen.

BACKGROUND

Under the typical user interface on current mobile devices, it can be ambiguous and/or unintuitive to rotate and translate a 3D object by using finger swipes on a touch screen. As shown in FIG. 4, a user's intention when swiping a finger across the touch screen might be either to translate (move) a displayed object, or to rotate the object. Typically, this ambiguity is resolved by requiring the user to put the application displaying the object into either a translate mode or rotate mode prior to performing the finger swipe.

Such translate/rotate mode switching is often achieved using a mode control switch, which is also displayed on the touch screen and may reduce the screen area available for the display of content. Further, the user must determine that the application is in the desired mode before swiping the finger. If the application is not in the desired mode, the resulting undesired translate/rotate change to the displayed object must be undone, the application changed to the desired mode, and the finger swipe repeated.

In other user interfaces, translate and rotate modes of the application may be avoided by assigning single-finger swipes to translation and multi-finger input to rotation. One such interface is shown in FIGS. 5A-5C. As shown in FIG. 5A, if two fingers are placed on the touch screen at the same time and moved in a generally circular motion, the displayed object may be rotated about a so-called "z-axis" that extends into and out of the screen. If two fingers are placed on the touch screen at the same time and moved together in a horizontal direction, as shown in FIG. 5B, the displayed object may be rotated about a so-called "y-axis" that extends vertically in the plane of the screen. Finally, as shown in FIG. 5C, if two fingers are placed on the touch screen at the same time and moved together in a vertical direction, the displayed object may be rotated about a so-called "x-axis" that extends horizontally in the plane of the screen.

Such a mapping of motions to rotations may be intuitive for z-axis rotation, as the actions mimic the actions of the user's fingers grasping the displayed object and rotating it. However, the finger actions for rotation in the y-axis and x-axis are not intuitive, must be memorized by the user, and may be forgotten if the application is not used frequently.

SUMMARY

In a first embodiment, a method for rotating a 3D object on a mobile electronic device screen includes detecting a first finger touch on a touch screen of a mobile electronic device. The method also includes detecting the presence of a second finger on a second sensor of the device. The second sensor is a different sensor than the touch screen. The method further includes detecting motion of the first finger while the second finger is present on the second sensor. In response, a 3D object displayed on a screen of the mobile electronic device is rotated by an amount related to the motion of the first finger.

In a further embodiment, the method includes detecting simultaneous motion of the first finger and the second finger, and rotating the 3D object by an amount related to both the motion of the first finger and the motion of the second finger.

In a second embodiment, a mobile electronic device includes a touch screen, a second sensor, a display, and a controller. The second sensor is a different sensor than the touch screen. The controller communicates with the touch screen, the second sensor, and the display. The controller is configured to display a 3D object on the display, detect a first finger touch on the touch screen, and detect the presence of a second finger on the second sensor. The controller is also configured to detect motion of the first finger while the second finger is present on the second sensor and, in response, rotate the 3D object on the display by an amount related to the motion of the first finger.

In a third embodiment, a non-transitory computer readable medium embodies a computer program. The computer program includes computer readable program code for detecting a first finger touch on a touch screen of a mobile electronic device. The program code also detects the presence of a second finger on a second sensor of the mobile electronic device, where the second sensor is a different sensor than the touch screen. The program code further detects motion of the first finger while the second finger is present on the second sensor and, in response, rotates a 3D object displayed on a screen of the mobile electronic device by an amount related to the motion of the first finger.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates manipulation of a 3D object in a typical user interface; and

FIGS. 5A, 5B, and 5C illustrate rotation of a 3D object in another typical user interface.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus and method for rotating 3D objects on a mobile device screen.

Figure 1A:
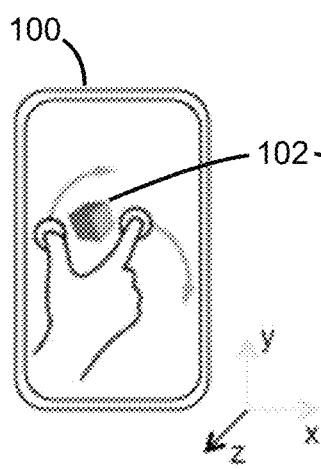
FIGS. 1A, 1B, and 1C illustrate the rotation of a 3D object on a mobile device screen according to one embodiment of the disclosure.
Figure 1B:
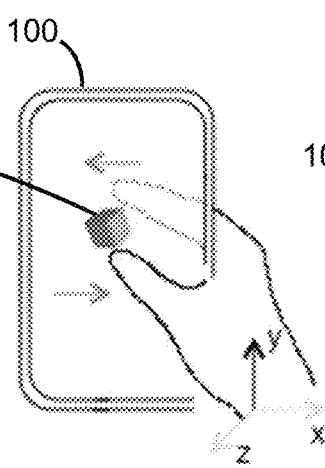
Figure 1C:
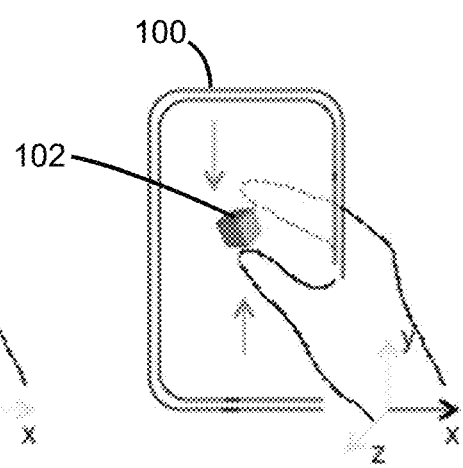

FIGS. 1A, 1B, and 1C illustrate the rotation of a 3D object 102 on a screen of mobile electronic device 100 according to one embodiment of the disclosure. An application according to the disclosure is running on the device 100 and displays the 3D object 102 on a front side screen of the device 100. Rotation of the object 102 according to the disclosure provides a more natural and intuitive user interface than prior interfaces, as it mimics the physical action of grasping an object between two fingers and moving the fingers side-to-side or up-and-down to rotate the object.

As shown in FIG. 1A, when a user of the device 100 places two fingers at the same time on a front touch screen of the device 100 and moves them in a generally circular motion, the application displayed object 102 is rotated about a "z-axis" that extends into and out of the screen. While the touch screen in FIG. 1A is referred to as the "front" touch screen herein, it will be understood that the touch screen may be located on any suitable side of the device 100.

In FIG. 1B, the user of the device 100 has placed a thumb on the front touch screen and, at the same time, a second finger on a sensor located on the opposite side of the device 100 to the front touch screen. On the device 100, the backside sensor is a touch pad, which is not visible in FIG. 1B. As shown by the horizontal arrows in FIG. 1B, the user is simultaneously moving the thumb to the right across the font touch screen and the second finger to the left across the backside touch pad. In response, that application rotates the object 102 around the "y-axis" extending vertically along the long axis of the device 100 by an amount that is based upon both the distance the thumb has moved across the front touch screen and the distance the finger has moved across the backside touch pad. In other embodiments, the application rotates the object 102 based upon the speed with which the user moves the thumb and/or finger.

In FIG. 1C, the user of the device 100, as shown by the vertical arrows, is simultaneously moving the thumb upwards across the font touch screen and the second finger downwards across the backside touch pad. In response, that application rotates the object 102 around the "x-axis" extending horizontally across the short axis of the device 100. Again, the amount of rotation is based on the distance and/or speed of motion of the thumb and finger on the front touch screen and backside touch pad, respectively.

The application according to the disclosure may also respond to moving only one or the other of the thumb and finger on the front touch screen and backside touch pad, respectively. When both thumb and finger are detected on their respective touch sensors, the application may respond to individual horizontal motion of either digit by rotating the object 102 about the y-axis, and to vertical motion by rotating about the x-axis. In some embodiments, such single-digit motion may rotate the object 102 at a slower rate than moving both thumb and finger at the same time.

While the embodiment shown in FIGS. 1A-1C has a backside touch pad as a second sensor, it will be understood that in other embodiments of the disclosure, other types of second sensors and other second sensor locations on the device 100 may be utilized. In some embodiments, the second sensor may be located on a side of the device 100 that is adjacent to the front touch screen.

In other embodiments, the second sensor may be a sensor that does not detect motion, such as a static fingerprint sensor, a simple light sensor, a physical switch, or any other suitable sensor for detecting the presence or absence of the user's finger on the sensor. In such embodiments, the presence of the user's finger on the sensor causes the application to respond to motion of the user's thumb on the front touch screen by rotating the object 102, rather than translating it.

Figure 2:
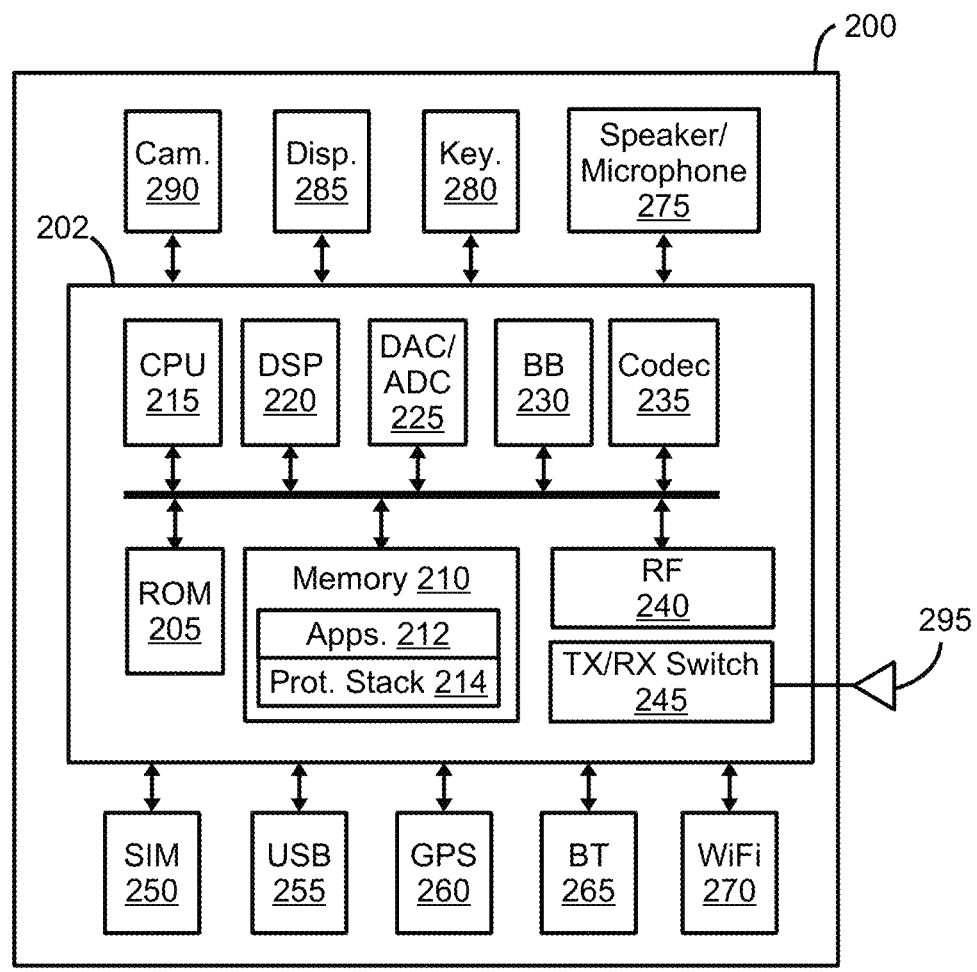
FIG. 2 illustrates an apparatus according to one embodiment of the disclosure.

FIG. 2 illustrates hardware elements of an electronic device (ED) 200 for use in a single sign-on system according to the disclosure. The ED 200 in FIG. 2 is a portable device, however, it will be understood that in other embodiments of the disclosure, the electronic device 200 may be a non-portable device. As described below, the ED 200 may be any of a wide variety of types of electronic devices. The ED 200 may include applications implementing a method for rotating 3D objects on a mobile device screen, as shown and described with reference to FIGS. 1 and 3.

The ED 200 comprises controller circuitry 202, which includes read-only memory (ROM) 205, random access memory (RAM) 210, central processing unit (CPU) 215, digital signal processor (DSP) 220, digital-to-analog converter (DAC)/analog-to-digital converter (ADC) circuitry 225, baseband (BB) circuitry block 230, codec circuitry block 235, radio frequency (RF) circuitry block 240, transmit (TX)/receive (RX) switch 245, and antenna 295.

In one embodiment, ROM 205 may store a boot-routine and other static data and RAM 210 may store an operating system (not shown), applications 212, and protocol stack 214. The ROM 205 and RAM 210 include a trusted execution environment or other secure area in which the confidentiality and integrity of code and data may be ensured. In an advantageous embodiment, ROM 205 and RAM 210 may comprise a single electronically erasable memory, such as a Flash memory, that is used in conjunction with a conventional RAM memory that is used to store dynamic data.

The ED 200 further comprises SIM card interface 250, USB interface 255, GPS receiver 260, Bluetooth (BT) transceiver 265, WiFi (or WLAN) transceiver 270, speaker and microphone circuitry block 275, keyboard 280, display 285, and camera 290. In some embodiments, keyboard 280 and display 285 may be implemented together as a touch screen display. In such embodiments, and in still other embodiments, keyboard 280 may further comprise one or more other type of sensor, such as a touch pad, a fingerprint sensor, a touch sensor, a light sensor, a physical switch, etc.

The CPU 215 is responsible for the overall operation of ED 200. In an exemplary embodiment, the CPU 215 executes applications 212 and protocol stack 214. CPU 215 runs the application layer and a wide variety of applications may be run in a smart phone implementation. Applications 212 may include audio, video, and image/graphics applications, in addition to applications related to embodiments of the present disclosure. CPU 215 may run applications 212 that support various audio formats such as MP3, MP4, WAV, and rm. CPU 215 may run image applications 212 that support JPEG image formats and video applications 212 that support video formats (e.g., MPEG-1 to MPEG-5). CPU 215 may support various operating systems (not shown), such as Symbian, java, android, RT-Linux, Palm, and the like. For time critical applications, CPU 215 runs a real-time operating system (RTOS). In addition to the physical layer, there are other layers, including protocol stack 214, that enable ED 200 to work with a network base station. In an exemplary embodiment, protocol stack 214 is ported on CPU 215.

DAC/ADC circuitry block 225 converts analog speech signals to digital signals, and vice versa, in GD 210. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 230 may be implemented as part of DSP 220, which executes many of the baseband processing functions (i.e., physical layer, Layer 1, or L1 functions). BB circuitry block 230 may be ported on DSP 220 to meet the latency and power requirements of GD 210. BB circuitry block 230 converts voice and data to be carried over the air interface to I/Q baseband signals.

BB circuitry block 230 may change from modem to modem for various air interface standards, such as GSM, CDMA, Wimax, LTE, HSPA, and others. BB circuitry block 230 is often referred to as the physical layer, or Layer 1, or L1. For mobile phones that work on GSM networks, the baseband part (Layer 1) running on DSP 220 and the protocol stack 214 running on CPU 215 are based on the GSM standard. For CDMA mobile phones, the Layer 1 and protocol stack 214 are based on the CDMA standard, and so on, for the LTE and HSPA standards-based mobile phones.

For speech or audio inputs, codec circuitry block 235 may compress and decompress the signal to match the data rate to the frame in which the data is sent. By way of example, codec circuitry block 235 may convert speech at an 8 KHz sampling rate to a 13 kbps rate for a full rate speech traffic channel. To do this, a residually excited linear predictive coder (RELP) speech coder may be which compresses 260 bits into a 20 ms. duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a viterbi decoder (used in receive path). Interleaving may be done for the data, which helps in spreading the error over time, thereby helping the receiver de-interleave and decode the frame correctly.

RF circuitry block 240 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 295 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of GD 210, antenna 295 may support different wire-area standards, including GSM, CDMA, LTE, and WiMAX, as well as short-range standards, including WiFi (WLAN), Bluetooth, and so on.

If antenna 295 comprises only one antenna used for both transmit and receive operations at different times, the TX/RX switch 245 couples both the transmit (TX) path and the receive (RX) path to antenna 295 at different times. TX/RS switch 245 is controlled automatically by DSP 220 based on a GSM frame structure with respect to the physical slot allocated for that particular GSM mobile phone in both the downlink and the uplink. For frequency division duplexing (FDD) systems, TX/RX switch 245 may be implement as a diplexer that acts as filter to separate various frequency bands.

The ED 200 provides connectivity with laptops or other devices using WiFi (or WLAN) transceiver 270, BT transceiver 265, and universal serial bus (USB) interface 255. The ED 200 also uses GPS receiver 260 in applications 212 that require position information. If ED 200 is a conventional smart phone, applications 212 may include many popular applications, such as Facebook, Twitter, a browser, and numerous games that come pre-installed with GD 210.

Speaker and microphone circuitry block 275 comprises microphone circuitry (or mic) that converts acoustic energy (i.e., air pressure changes caused by speech or other sounds) to electrical signals for subsequent processing. Speaker and microphone 275 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

The ED 200 preferably includes camera 290. Presently, almost all mobile phones feature a camera module. Camera 290 may comprise a 12 megapixel, 14 megapixel, or even a 41 megapixel camera.

Display 285 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 280 may comprise a simple matrix type keypad that contains numeric digits (0 to 9), alphabetic characters (A to Z), special characters, and specific function keys. In a more advanced embodiment for a smart phone implementation, keypad 280 may be implemented in the mobile phone software, so that keyboard 280 appears on display 285 and is operated by the user using the touch of a finger tip.

BB circuitry block 230, RF circuitry block 240, TX/RX switch 245, WiFi (or WLAN) transceiver 270, BT transceiver 265, and USB interface 255 comprise a communications interface that enables the ED 200 to communicate either wired or wirelessly with PMDs 104 and RS 106.

According to the principles of the disclosure, applications 212 include at least one application providing the functionality of displaying a 3D object and rotating the object in response to thumb and finger activity on a front touch screen and second sensor, as shown and described with reference to FIGS. 1 and 3.

According to various embodiments of the present disclosure, an electronic device may include communication functionality. For example, an electronic device may be a smart phone, a tablet Personal Computer (PC), a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., navel navigator device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing device.

Figure 3:
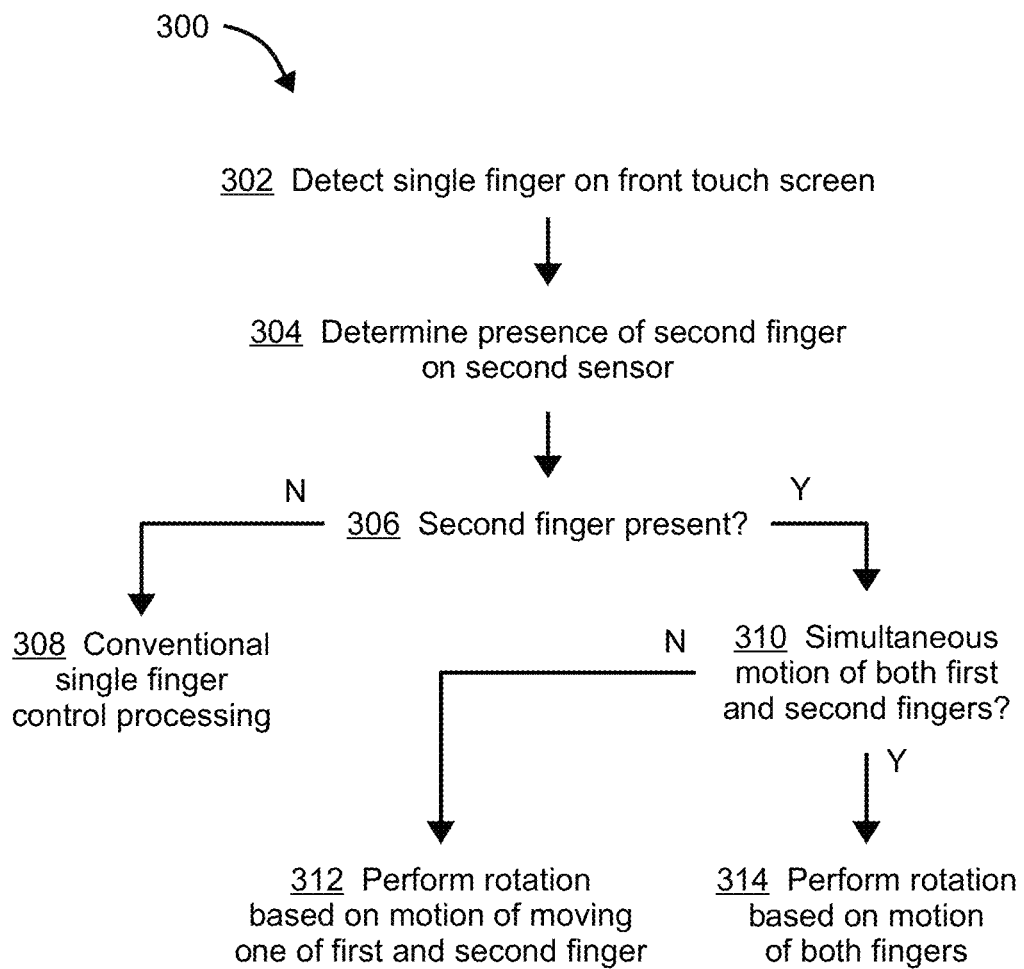
FIG. 3 illustrates a method according to one embodiment of the disclosure.

FIG. 3 illustrates a method 300 according to one embodiment of the disclosure. For ease of understanding, the method 300 will be described as though performed by a system according to the disclosure as described with reference to FIGS. 1 and 2.

In step 302, a single thumb (or finger) is detected on a front touch screen of an electronic device according to the disclosure. In step 304, it is determined whether, at the same time, a second finger is present on a second sensor of the electronic device. In step 306, a decision is made based upon the results of the determination made in step 304. If no finger is present on the second sensor when the first finger/thumb is detected on the front touch screen, the method 300 proceeds to step 308, in which other elements of the user interface perform conventional control processing of single-finger input.

If, in step 306, it is determined that a first finger is touching the front touch screen at the same time as a second finger is present on the second sensor, then in step 310 a determination is made whether both first and second fingers are in simultaneous motion. If only one finger is in motion, then in step 312 the 3D object 102 is rotated by an amount related to the amount and/or speed of the sole moving finger. If both the first and second fingers are in motion, then in step 314 the 3D object 102 is rotated by an amount related to the amount and/or speed of one or both of the moving fingers.

While both the first and second fingers are detected as present, but neither is moving, the method 300 remains in step 310, awaiting the motion of one or both fingers. In any step of the method 300, when either the first or second finger ceases to be present, the method 300 terminates and returns to steps 302 and 304 to await the presence of one or both of the first and second fingers on the front touch screen and the second sensor, respectively.

In steps 312 and 314, a direction of the sensed motion of one or both fingers determines an axis of rotation of the object 102. If the finger motion is primarily horizontal, then the object 102 is rotated about its vertical, y-axis. If the finger motion is primarily vertical, then the object 102 is rotated about its horizontal, x-axis. If the finger motion is in a diagonal direction, then the object 102 is rotated about a diagonal axis that is generally perpendicular to the direction of motion.

While FIG. 1A depicts both the first and second fingers contacting the front touch screen to rotate the object 102 about the z-axis, it will be understood that z-axis rotation may be performed additionally or alternately with a first finger on the front touch screen and a second finger on the second sensor. If the finger motion of either or both fingers is generally circular, then in steps 312 and/or 314 the object 102 may be rotated about the z-axis.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for rotating a 3D object on a mobile electronic device screen, the method comprising:
    detecting a first touch on a touch screen display of a mobile electronic device;
    determining whether a second touch is detected, concurrent with the first touch, on a sensor of the mobile electronic device, wherein the sensor is disposed on a portion of the mobile electronic device excluding the touch screen display, wherein the sensor senses a presence or absence, and movement or non-movement of the second touch on the sensor;
    at a first time instance, in response to determining the absence of the second touch, performing translational movement of a 3D object on the touch screen display with the first touch; and
    at a second time instance, in response to determining the presence of the second touch performing rotational movement of the 3D object as a function of a direction of movement of the first touch and a relative speed of the first touch and the second touch, wherein the direction of movement of the first touch varies an axis of rotation.

2. The method of claim 1, wherein the sensor is one of a finger print sensor, a light sensor, and a physical switch.

3. The method of claim 1, wherein the touch screen display is located on a first side of the mobile electronic device and the sensor is located on a second side of the mobile electronic device, wherein the first and second sides are opposing sides.

4. The method of claim 1, wherein the touch screen display is located on a first side of the mobile electronic device and the sensor is located on a second side of the mobile electronic device, wherein the second side is a side adjacent to the first side.

5. A mobile electronic device, comprising:
    a touch screen display;

a sensor that senses a presence or absence, and movement or non-movement of a second touch on the sensor, wherein:
the sensor is disposed on a portion of the mobile electronic device excluding the touch screen display; and
a controller, communicatively coupled to the touch screen display and to the sensor, wherein the controller is configured to:
display a 3D object on the touch screen display;
detect a first touch on the touch screen display;
determine whether the second touch is detected, concurrent with the first touch, on the sensor of the mobile electronic device;
at a first time instance, in response to a determination of the absence of the second touch, perform translational movement of a 3D object on the touch screen display with the first touch; and
at a second time instance, in response to a determination of the presence of the second touch perform rotational movement of the 3D object as a function of a direction of movement of the first touch and a relative speed of the first touch and the second touch, wherein the direction of movement of the first touch varies an axis of rotation.

6. The mobile electronic device of claim 5, wherein the sensor is one of a finger print sensor, a light detector, and a physical switch.

7. The mobile electronic device of claim 5, wherein the touch screen display is located on a first side of the mobile electronic device and the sensor is located on a second side of the mobile electronic device, wherein the first and second sides are opposing sides.

8. The mobile electronic device of claim 5, wherein the touch screen display is located on a first side of the mobile electronic device and the sensor is located on a second side of the mobile electronic device, wherein the second side is a side adjacent to the first side.

9. A non-transitory computer readable medium including a plurality of instructions that, when executed by a processor, are configured to cause the processor to:
detect a first touch on a touch screen display of a mobile electronic device;
determine whether a second touch is detected, concurrent with the first touch, on a sensor of the mobile electronic device, wherein the sensor is disposed on a portion of the mobile electronic device excluding the touch screen display, wherein the sensor senses a presence or absence, and movement or non-movement of the second touch on the sensor;
at a first time instance, in response to a determination of the absence of the second touch, perform translational movement of a 3D object on the touch screen display with the first touch; and
at a second time instance, in response to a determination of the presence of the second touch perform rotational movement of the 3D object as a function of a direction of movement of the first touch and a relative speed of the first touch and the second touch, wherein the direction of movement of the first touch varies an axis of rotation.

10. The non-transitory computer readable medium of claim 9, wherein the sensor is one of a fingerprint sensor, a light sensor, and a physical switch.

11. The non-transitory computer readable medium of claim 9, wherein the touch screen display is located on a first side of the mobile electronic device and the sensor is located on a second side of the mobile electronic device, wherein the first and second sides are opposing sides.

12. The non-transitory computer readable medium of claim 9, wherein the touch screen display is located on a first side of the mobile electronic device and the sensor is located on a second side of the mobile electronic device, wherein the second side is a side adjacent to the first side.

* * * * *